United States Patent
Kujawinski et al.

(10) Patent No.: US 11,983,636 B2
(45) Date of Patent: May 14, 2024

(54) AUTOMATED ANALYTICAL MODEL RETRAINING WITH A KNOWLEDGE GRAPH

(71) Applicant: Accenture Global Solutions Limited, Dublin (IE)

(72) Inventors: Matthew Kujawinski, San Jose, CA (US); Zhijie Wang, Fremont, CA (US); Teresa Sheausan Tung, Tustin, CA (US); Louis Gerald Farfan, Lomita, CA (US)

(73) Assignee: Accenture Global Solutions Limited, Dublin (IE)

( * ) Notice: Subject to any disclaimer, the term of this patent is extended or adjusted under 35 U.S.C. 154(b) by 581 days.

(21) Appl. No.: 16/743,130

(22) Filed: Jan. 15, 2020

(65) Prior Publication Data
US 2020/0387803 A1  Dec. 10, 2020

Related U.S. Application Data

(60) Provisional application No. 62/856,894, filed on Jun. 4, 2019.

(51) Int. Cl.
| | | |
|---|---|---|
| G06N 5/022 | (2023.01) | |
| G06F 18/21 | (2023.01) | |
| G06F 18/40 | (2023.01) | |
| G06N 5/02 | (2023.01) | |
| G06N 20/00 | (2019.01) | |

(52) U.S. Cl.
CPC ........... *G06N 5/022* (2013.01); *G06F 18/217* (2023.01); *G06F 18/40* (2023.01); *G06N 5/02* (2013.01); *G06N 20/00* (2019.01)

(58) Field of Classification Search
CPC .......... G06F 16/33; G06F 40/40; G06Q 10/06
See application file for complete search history.

(56) References Cited

U.S. PATENT DOCUMENTS

| | | | |
|---|---|---|---|
| 9,348,815 B1* | 5/2016 | Estes | G06F 40/40 |
| 2014/0280307 A1* | 9/2014 | Gupta | G06F 16/3331 |
| | | | 707/769 |
| 2017/0372232 A1* | 12/2017 | Maughan | G06F 3/0482 |
| 2018/0240041 A1* | 8/2018 | Koch | G06N 3/126 |
| 2019/0102693 A1* | 4/2019 | Yates | G06N 20/00 |
| 2019/0340518 A1* | 11/2019 | Merrill | G06Q 10/0633 |
| 2020/0193981 A1* | 6/2020 | Ji | G10L 15/08 |
| 2020/0226461 A1* | 7/2020 | Heinrich | G06N 3/08 |

OTHER PUBLICATIONS

Zhang, Wei, Martin Hirzel, and David Grove. "AQuA: adaptive quality analytics." Proceedings of the 10th ACM International Conference on Distributed and Event-based Systems. 2016. https://dl.acm.org/doi/pdf/10.1145/2933267.2933309 (Year: 2016).*

* cited by examiner

*Primary Examiner* — Kakali Chaki
*Assistant Examiner* — Michael H Hoang
(74) *Attorney, Agent, or Firm* — Crowell & Moring LLP

(57) ABSTRACT

A model retraining tool is provided for utilizing a knowledge graph to retrain analytical models used in production. The model retraining tool retrains the analytical models to improve performance of the analytical models in an efficient and resource conserving manner.

20 Claims, 4 Drawing Sheets

AUTOMATED ANALYTICAL MODEL RETRAINING WITH A KNOWLEDGE GRAPH

CROSS REFERENCE

This application is based on and claims priority to U.S. Provisional Application No. 62/856,894 filed on Jun. 4, 2019.

TECHNICAL FIELD

Complex computer system architectures are described for utilizing a knowledge graph to retrain an analytical model to improve performance of the analytical model.

BACKGROUND

Analytical models are used in production to automate certain processes. However, as time goes on, the performance of analytical models may degrade in performance. This degradation in performance is commonly referred to as "drifting" within the relevant field, and may occur for a variety of reasons. Some exemplary reasons include, but not necessarily limited to, a deficiency in the dataset being used by the analytical model, or changes in the assumptions made when developing analytical model.

Traditional processes for retraining analytical models are expensive, time-consuming, and dependent on isolated domain knowledge (e.g., small number of individual data scientists who developed the model). Also, much of the retraining is accomplished by a burdensome process of users manually updating datasets and parameters of the analytical models.

DETAILED DESCRIPTION

Retraining analytical models may be implemented from time to time to bring lower performing analytical models back into conformance with desired performance levels. However, the retraining process to improve the performance of analytical models that have drifted from acceptable performance levels, can be expensive in terms of costs and resources (e.g., computing resources, agents, or other enterprise resources).

To address these technical problems, a model retraining tool (MR tool) is provided that creates and utilizes a knowledge graph (KG) for automating the retraining of analytical models. The KG created by the MR tool may be referred to as a retraining KG. The retraining KG captures data and metadata pertaining to the execution of models, infers which feature (or explanatory variable) weights cause a given model to underperform, and uses the inferred information to retrain the models. By automating the retraining process, the MR tool provides insight to other enterprise resources working with the models from a development, deployment, or monitoring perspective. The MR tool may include the software, hardware, middleware, application programming interface (API), and/or circuitry for implementing the corresponding features attributed to the MR tool.

The retraining KG offers an innovative data structure for presenting large amounts of relevant information into a structured data format that includes entity nodes, as well as relationship information between the entity nodes. The retraining KG includes a knowledge base of relevant information structured in a graph presentation that captures entities (i.e., nodes), relationships (i.e., edges), and attributes (i.e., node properties or edge properties) with semantic meaning. This graph data structure model offered by the retraining KG provides the semantic meaning of the included data, by modeling data with a predetermined schema having a specified ontology and/or taxonomy. Accordingly, technical improvements are realized when a computing device structures information into knowledge graphs and utilizes the knowledge graphs to determine efficient solutions for retraining analytical models. This specifically results in the retrieval of more relevant and accurate information, in a shorter amount of time. For purposes of this disclosure, the analytical models may refer to, for example, machine learning (ML) models.

Figure 2:
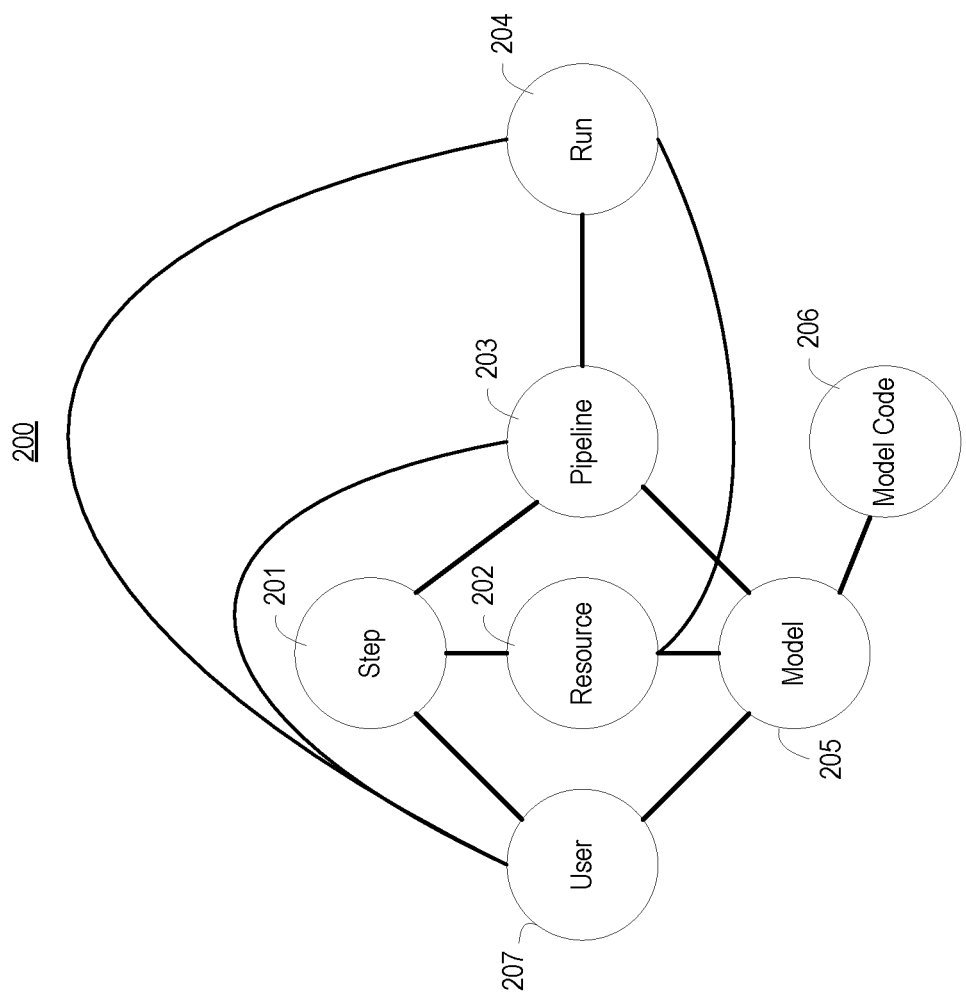
FIG. 2 shows an exemplary knowledge graph, according to some embodiments.

FIG. 2 shows an exemplary retraining KG 200 that may be generated by the MR tool. The retraining KG 200 may be utilized by the MR tool to retrain analytical models executed in production, where the retraining KG provides a smarter dataset for the MR tool to determine efficient ways to retrain the analytical models and improve their performance.

As shown in FIG. 2, the retraining KG 200 is comprised of nodes (may also be referred to as entities) that represent data, and edges linking together nodes that represent relationships between nodes. The retraining KG 200 includes a user node 207, a step node 201, a resource node 202, a pipeline node 203, a run node 204, a model node 205, and a model code node 206. The retraining KG 200 may be a full knowledge graph, or be a representation of a portion of a larger retraining KG that includes additional model nodes, where the MR tool may utilize the larger retraining KG to retrain one or more analytical models used in production.

The retraining KG 200 offers a comprehensive view of all the analytical models that are being used during a production application for a particular enterprise job. By representing the analytical models in the retraining KG 200, the MR tool can efficiently (e.g., faster, and/or using less resources) learn how the analytical models are performing relative to each other from the information provided within the retraining KG 200 itself. This way, the MR tool can determine which analytical models are performing well, determine why those analytical models are performing well, and try to retrain the lower performing analytical models based on what is learned from the higher performing analytical models.

Each node includes a specific set of properties associated with it. For example, the step node 201 is an evaluation of any intermediary steps that have been implemented in the overall operation pipeline of the enterprise job utilizing the analytical models. The step node 201 may include one or more of the following data properties: ID, Name, Project, Version, Step Type, Language, Description, Date/Time Created, Environment, Arguments.

The user node 207 represents users within a system being used to implement the enterprise job. For example, the user node 207 may identify users that are uploading data to the pipeline, users that are uploading the models, users that are otherwise actively involved in the development of the analytical models (e.g., data scientists developing the analytical models for use in production), management of the enterprise job (e.g., project managers approve the models being used in production, and may define the relationships between the entities in the KG), and users that are updating the analytical models in production. The user node 207 may include one or more of the following data properties: ID, Name, Role.

The resource node 202 represents datasets being used as inputs to the analytical models in production. The resource node 202 may include one or more of the following properties: ID, Name, Project, Version, Source File, File Type, Description, Date/Time Created, Data Quality, Data Type.

The pipeline node 203 references a specific operation pipeline that includes the analytical models being managed by the MR tool, where the operation pipeline may be comprised of one or more analytical models and steps. The pipeline node 203 may include one or more of the following properties: ID, Name, Project, Version, Date/Time Created, Description, Status.

Figure 3:
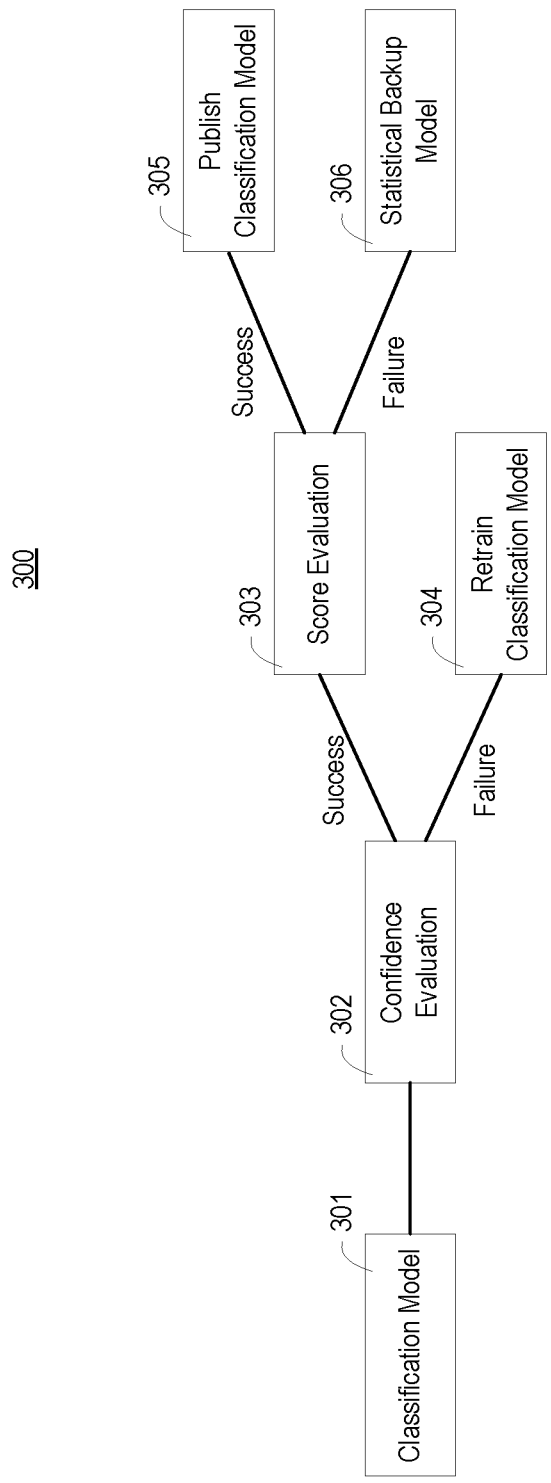
FIG. 3 shows an exemplary operation pipeline including analytical models and steps in production, according to some embodiments.

An exemplary operation pipeline 300 is shown in FIG. 3. The operation pipeline 300 includes evaluation steps: 302 and 303, as well as model steps: 301, 304, 305, and 306. The evaluation steps include confidence evaluation step 302 and score evaluation step 303. The model steps include establishment of classification model 301, retraining of the classification model 304, publishing of the classification model 305, and statistical backup model analysis 306. According to some embodiments, the operation pipeline may further include one or more recipe steps, which are not expressly shown in the operation pipeline 300. The operation pipeline 300 outlines the process flow of steps that are executed during the implementation of an analytical model.

The run node 204 represents run time information for the analytical models. The run node 204 may include one or more of the following properties: ID, Version, Date/Time Executed, Arguments, Status, Log Message.

The model node 205 represents an analytical model being used in the operation pipeline. Within the retraining KG, the edges between the model node 205 and the user node 207 represent the relationships between the users and the analytical models that the users are interacting with. The edges between the model node 205 and the resource node 202 represent the specific datasets being used as inputs to the analytical model. The edges between the model node 205 and the pipeline node 203 represents specific operation pipelines the analytical model is being utilized in. The model node 205 may include one or more of the following properties: ID, Name, Project, Version, Model Binary, Arguments, Training Arguments, Required Libraries, Date/Time Created, Environment.

The model code node 206 represents information relating to the algorithms and codes used to implement the analytical models represented by the model node 205 that is connected by the edge to the model code node 206. The model code node 206 identifies the parameters that are being used in the corresponding analytical model. This information allows users to see similarities between the current analytical model and other analytical models for comparison. This comparison can be used to compare analytical models that are receiving similar dataset inputs, and detect which analytical models are producing superior results. If particular analytical models are performing better, the reasons for the better performance can be determined based on the properties of the higher performing analytical model (different parameters of the other ML model), as the analytical models being compared are all starting with similar dataset inputs. The model code node 206 may include one or more of the following properties: ID, Code Type, Description, Content.

The retraining KG 200 is provided for exemplary purposes, as other retraining KGs that include more, or fewer, nodes may also be used.

Figure 1:
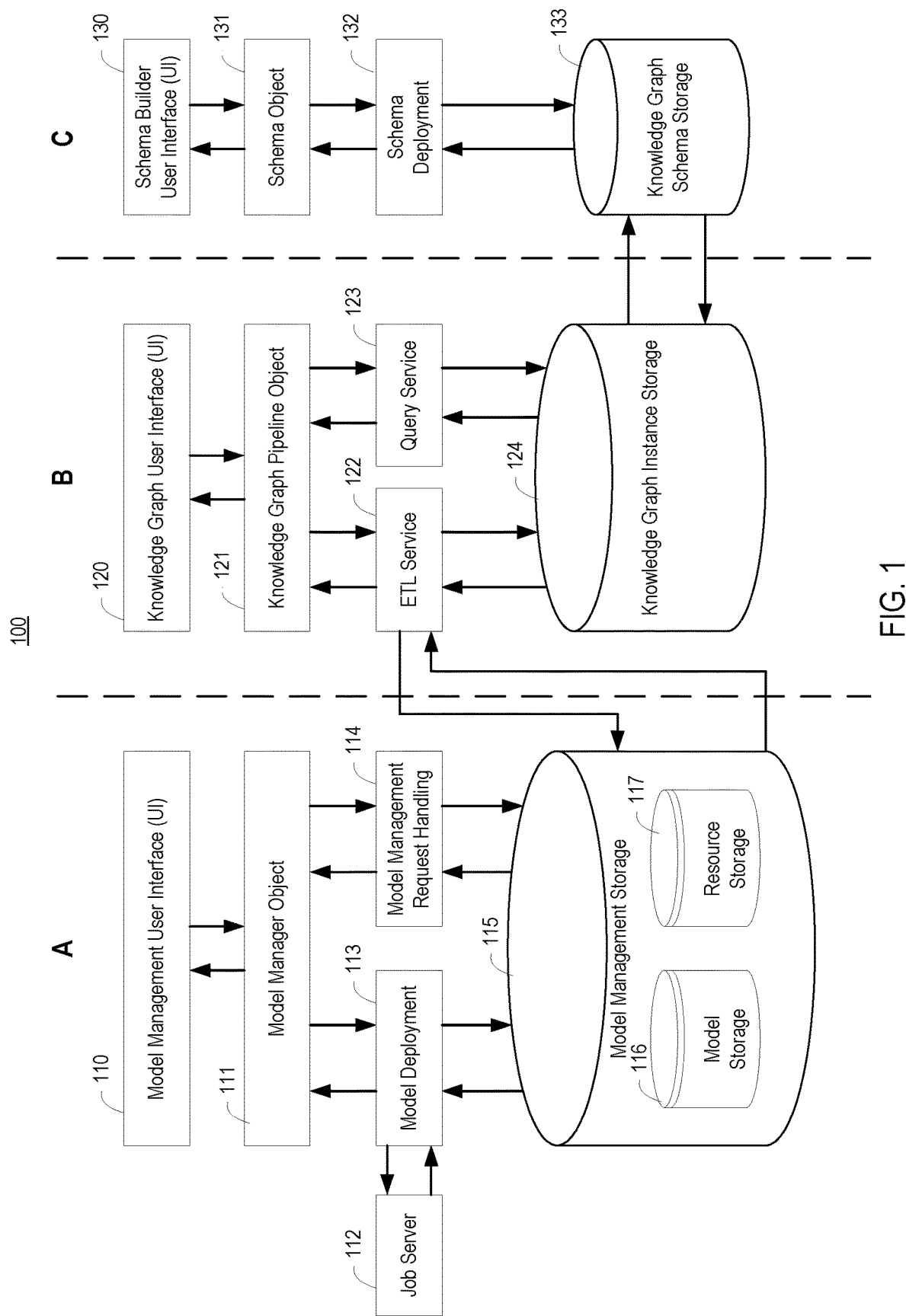
FIG. 1 shows an exemplary block diagram for a model retraining tool, according to some embodiments.

As shown by the block diagram in FIG. 1, a query service of the MR tool is tasked with running analyses on the retraining KG. For example, the query service may be an application programming interface (API) that runs analysis (e.g., queries) on the retraining KG at set intervals automatically, or based on the detection of predetermined trigger events. The results from the analysis may be used to then retrain analytical models that are detected to have a degradation in performance or otherwise not meeting expected performance criteria. The analysis may be categorized into the following types: 1) Model analysis, 2) Data analysis, and 3) Model retraining. The MR tool may further return model insights and/or data and other general insights as part of the query service.

The model analysis may include a query to determine which models are not performing well and should be retrained, a query to determine which models in the retraining KG are similar, and/or a query on which analytical model should be recommended to a user for use in the enterprise job for a specified use situation. With the set of model analysis, the MR tool is working to understand what can be learned from the analytical models. By determining the answers to these model analysis queries, the MR tool will begin to understand what changes, updates, or retraining should take place on underperforming analytical models. After determining the answers to these model analysis queries, the MR tool may determine which models are not performing well and should be retrained, which models are similar (to understand why other models are performing better), and which model should be recommended for use (recommend replacement of poorly performing analytical model with a better analytical model alternative that performs better).

The data analysis may include a query for determining which datasets are low quality (e.g., incomplete, sparse, high percentage of errors or missing fields), and/or a query for which datasets can be used for a given analytical model. The data analysis may be utilized by the MR tool to determine which datasets being used by the analytical models are low quality, so that they can be targeted for retraining or updating (e.g., retrain to increase robustness or improve correlation of data to analytical model goals). The data analysis may be utilized by the MR tool to determine which datasets can be used for a given model (i.e., which datasets are ok to continue use), after determining the quality of a dataset. For example, the MR tool may determine whether dataset A (having high quality) can be used to train dataset B (larger dataset) to improve quality of dataset B. A high quality dataset may be defined as being complete (all available fields are completed), robust (enough dataset to be representative), and/or applicable to analytical model goals. The MR tool may periodically check the datasets to make sure they maintain high quality for producing high performing analytical model results. The datasets may be within the resource node in the retraining KG, or the retraining KG may have a pointer to an external data source (data object) providing the dataset input.

The model retraining may include a query determining which dataset should be used for retraining, a query determining which models are to be retrained, which model hyper-parameters or arguments should be updated, and/or determining whether there are detectable performance improvements after a given analytical model was retrained. The MR tool utilizes the model retraining queries to determine which analytical models need retraining, how to retrain the analytical models, and provide an assessment on whether retraining has improved the performance of the analytical models.

In addition to the direct queries, the MR tool may provide model insights. For example, the MR tool may provide feedback insights on why were the given hyper-parameters or arguments updated, feedback insights on what pipelines are going to be impacted by the updated analytical model, feedback insights on why should a given analytical model be retrained, feedback insights on which data scientists produce the best results, and/or feedback insights on which analytical model algorithms (e.g., which machine learning algorithms) lead to better results for a given type of dataset. The model insights are prepared by the MR tool to inform a user on why an action was taken by the MR tool to update the parameters of the analytical models.

The MR tool may also provide data and general insights. For example, the MR tool may provide feedback insights on why a given dataset was used for retraining, why should a given dataset be used, and/or where do the highest quality datasets come from. The data and general insights are prepared by the MR tool to inform users with answers to data-related actions taken by the MR tool.

FIG. 1 shows an exemplary block diagram of a retraining system 100 on which the retraining processes described herein and attributed to the MR tool may be executed. The block diagram also includes process flows that may be implemented by the MR tool using the retraining system 100.

A more detailed description of the processes implemented by the retraining system 100 is provided. For illustration purposes, the processes are shown in FIG. 1 as divided into three categories A, B and C. Shown in column C are components and steps for developing a knowledge graph schema (e.g., the schema object 131) used to build a retraining knowledge graph, as well as preparing the retraining knowledge graph for subsequent retraining processes. The knowledge graph schema may be stored in the knowledge graph schema storage 133. After the knowledge graph schema is created, the specific data instances stored in the knowledge graph instance storage 124 may be accessed to create a retraining KG according to the parameters of the knowledge graph schema. Once the retraining KG is created, the retraining KG may be stored for further reference within the model management (MM) storage 115.

More specifically, in column C:
a schema builder user interface (UI) 130 is used to create a knowledge graph schema to model analytical models, data, and/or other concepts associated with the development and deployment of analytical models.

This collection of data that includes the knowledge graph schema is referenced as the schema object 131, and the schema object 131 is published as a new schema or update to an existing schema by a schema deployment module 132.

After publishing, the schema object 131 is stored in the knowledge graph schema storage 133 for future reference.

Shown in column A are the components and steps for deploying analytical models for a specific job, and managing the deployment operation pipeline. The steps in column A also include model preparation and data logging steps. The analytical models are stored in the model storage 116 of the MM storage 115. According to some embodiments, each of the storage units shown in the system diagram of FIG. 1 may be included as part of a common data storage platform.

More specifically, in column A:
A model management user interface (UI) 110 uploads data, analytical models, and any other supporting model assets to the retraining system 100, and in particular to the MR tool.

This collection of data may be referred to as a model manager object 111.

The model management object 111 is transmitted to a model deployment module that determines when to approve and deploy the analytical models.

The model manager object 111 may be stored in designated bins of the model storage 116 that is part of the model management storage 115.

The model deployment module transmits the model manager object 111 to a job server 112, and the job server 112 is responsible for running the analytical models in the model manager object 111 in their specified language and runtime environment.

After running the analytical models, the job server 112 returns an analytical model run status and results back to the model deployment module 113 if there are no errors detected. These results may then be stored in their designated bins within the model management storage 115.

Shown in column B are components and steps for generating the retraining KG with the specific instances of data stored in the knowledge graph instance storage 124, as well as dataset information received from the resource storage 117. Column B also represents the components and steps for running the queries on the retraining KG that will be used to retrieve the applicable responses for the retraining process, as well as data collection and aggregation steps.

More specifically, in column B:
A knowledge graph user interface (UI) 120 sends a request to a knowledge graph pipeline object 121 for model management data (e.g. model management object 111) to ingest into an instance of a retraining knowledge graph.

After receiving this request, the knowledge graph pipeline object 121 selects one or more pipelines to fulfill this request for the model management data.

After the one or more pipelines are selected, an ETL (extract, transform, load) service module 122 is assigned to retrieve the model management data from an appropriate storage bin within the model management storage 115.

After retrieving the model management data from the model management storage 115, any required data transformations may be applied to the model management data within the pipeline being utilized to transfer the model management data.

As part of the first data writing process, the ETL service module 122 controls the following steps:
1. retrieve an instance of the retraining knowledge graph from the knowledge graph instance storage 124, where the model management data will be written into the retrieved retraining knowledge graph;
2. retrieve a knowledge graph schema to base the retraining knowledge graph instance on from the knowledge graph schema storage 133;
3. return the knowledge graph schema from the knowledge graph schema storage 133 back to the knowledge graph instance storage 124; and 4. check the model management data for any formatting issues, and fix the formatting issues as they are detected.

After retrieving the appropriate retraining knowledge graph, the ETL service module controls the writing of the model management data into the retraining knowledge graph based on the information it has retrieved (e.g., knowledge graph schema information).

Subsequently, column B shows additional steps for model analysis. More specifically:

- the knowledge graph UI 120 creates queries to infer information across all knowledge graph objects (e.g., knowledge graph instance, entity, relationship, property) from the knowledge graph pipeline object 121.
- The created queries are received by the query service module 123, where the query service module 123 then calls the particular queries or sets up the queries as a constantly available web service.
- When calling the particular queries, the query service module 123 accesses the knowledge graph instance storage 124 to query the retraining knowledge graph instance or have the query "listen" to the knowledge graph instance storage 124 to detect changes in the retraining knowledge graph instance.
- The results from the queries to the retraining knowledge graph instance stored in the knowledge graph instance storage 124 are then returned to the query service module 123.
- The query service module 123 organizes and formats the query response into the knowledge graph pipeline object 121.
- The formatted query response, in the format of the knowledge graph pipeline object 121, is then returned to the knowledge graph UI 120 to be presented.

Subsequently, column B shows additional steps for model retraining. More specifically:

- The query service module 123 creates a separate query for poorly performing models, and accesses the knowledge graph instance storage 124 to run the query on instances of retraining knowledge graphs. A poorly performing model may, for example, be one that is detected to make inaccurate predictions.
- Results to the query from the knowledge graph instance storage 124 are then returned to the query service module 123 in the format of a query response.
- The query service module 123 organizes and formats the query response into the knowledge graph pipeline object 121.
- Notifications on poorly performing analytical models which are determined to need retraining, are determined by an analysis on the corresponding knowledge graph pipeline object 121 and then transmitted to the knowledge graph UI 120 for presentation.
- Based on a command generated at the knowledge graph UI 120, a request to retrain the poorly performing analytical model is sent as a knowledge graph pipeline object to the ETL service module 122.
- From the ETL service module 122, one or more pipelines that perform retraining on analytical models in the retraining knowledge graph instance are called.
- The pipelines performing the retraining will update the analytical model features in the retraining knowledge graph instance, and also test the updated analytical models on datasets found in the retraining knowledge graph instance.
- The results of retraining from the retraining knowledge graph instance are retrieved from the knowledge graph instance storage 124, and then returned to the ETL service module 122.
- The ETL service module 122 organizes and formats the results into the knowledge graph pipeline object 121. The results are then sent to the knowledge graph UI 120 to present the updates, whether potential or implemented updates to the analytical models.
- At the knowledge graph UI, a user acknowledges the updates and sends a request to publish updated analytical models to the model management storage 115.
- One or more pipelines are called via the knowledge graph pipeline object 121 for sending data to the model management storage 115.
- The updated analytical models are sent to the model management storage 115 through the one or more pipelines via the ETL service module 122, and published to the model management storage 115.
- A confirmation of the successful publishing of the updated analytical models to the model management storage 115 is sent from the model management storage 115 back to the ETL service module 122.
- From the ETL service module, newly published analytical models from the model management storage 115 are written to a retraining knowledge graph instance stored in the knowledge graph instance storage 124.

Subsequently, column B shows additional steps for providing various insights to the implemented retraining process. More specifically:

- A response is sent from the knowledge graph instance storage 124 to the query service module 123, where this response contains updates to retrained analytical models as well as other updates to the retraining knowledge graph instance.
- The response is organized and reformatted by the query service module 123 into the knowledge graph pipeline object 121.
- The formatted response is then transmitted to the knowledge graph UI 120 to present insights into the updates, whether potential or implemented updates, to the analytical models. The update insights are presented to be viewed by, for example, data scientists, model engineers, knowledge engineers, or business users that are operating the MR tool.

Subsequently, column A shows additional steps for providing insights to the implemented retraining process. More specifically:

- A response is sent from the model management storage 115 to the model management request handling module 114, where this response contains updates to retrained analytical models as well as other updates to the retraining knowledge graph instance.
- The response is organized and reformatted by the model management request handling module 114 into the model manager object 111.
- The formatted response is then transmitted to the model management UI 110 to present insights into the updates, whether potential or implemented updates, to the analytical models. The update insights are presented to be viewed by, for example, data scientists, model engineers, knowledge engineers, or business users that are operating the MR tool.

A module may include the software, hardware, middleware, application programming interface (API), and/or circuitry for implementing the corresponding features attributed to the module.

Figure 4:
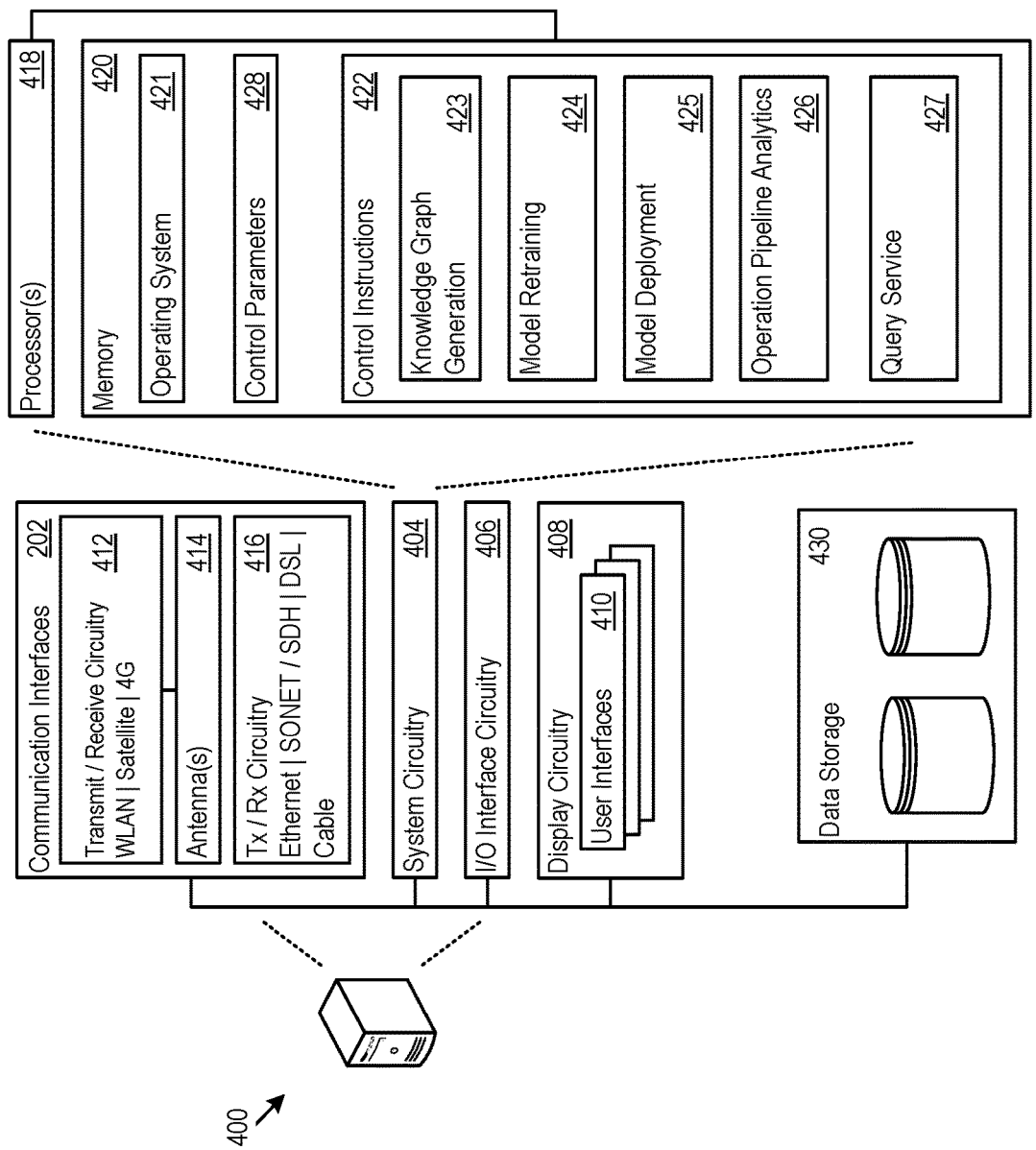
FIG. 4 shows an exemplary computer architecture for a computer device used to implement a model retraining tool, according to some embodiments.

FIG. 4 illustrates an exemplary computer architecture of a computer device 400 on which the features of a MR tool for retraining analytical models may be executed. The computer device 400 includes communication interfaces 402, system circuitry 404, input/output (I/O) interface circuitry 406, and display circuitry 408. The graphical user interfaces (GUIs) 410 displayed by the display circuitry 408 may be representative of GUIs generated by the MR tool to retrain analytical models. The graphical user interfaces (GUIs) 410 displayed by the display circuitry 408 may also be representative of GUIs generated by the MR tool to receive any of the query inputs, as well as display the answers to the queries described herein. The GUIs 410 may be displayed locally using the display circuitry 408, or for remote visualization, e.g., as HTML, JavaScript, audio, and video output for a web browser running on a local or remote machine. Among other interface features, the GUIs 410 may further render displays of the retraining KG described herein.

The GUIs 410 and the I/O interface circuitry 406 may include touch sensitive displays, voice or facial recognition inputs, buttons, switches, speakers and other user interface elements. Additional examples of the I/O interface circuitry 406 includes microphones, video and still image cameras, headset and microphone input/output jacks, Universal Serial Bus (USB) connectors, memory card slots, and other types of inputs. The I/O interface circuitry 406 may further include magnetic or optical media interfaces (e.g., a CDROM or DVD drive), serial and parallel bus interfaces, and keyboard and mouse interfaces.

The communication interfaces 402 may include wireless transmitters and receivers ("transceivers") 412 and any antennas 414 used by the transmit and receive circuitry of the transceivers 412. The transceivers 412 and antennas 414 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 402 may also include serial interfaces, such as universal serial bus (USB), serial ATA, IEEE 1394, lighting port, $I^2C$, slimBus, or other serial interfaces. The communication interfaces 402 may also include wireline transceivers 416 to support wired communication protocols. The wireline transceivers 416 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 404 may include any combination of hardware, software, firmware, APIs, and/or other circuitry. The system circuitry 404 may be implemented, for example, with one or more systems on a chip (SoC), application specific integrated circuits (ASIC), microprocessors, discrete analog and digital circuits, and other circuitry. The system circuitry 404 may implement any desired functionality of the MR tool. As just one example, the system circuitry 404 may include one or more instruction processor 418 and memory 420.

The memory 420 stores, for example, control instructions 422 for executing the features of the MR tool, as well as an operating system 421. In one implementation, the processor 418 executes the control instructions 422 and the operating system 421 to carry out any desired functionality for the MR tool, including those attributed to knowledge graph generation 423 (e.g., relating to knowledge graph generation circuitry), model retraining 424 (e.g., relating to model retraining circuitry), model deployment 425 (e.g., relating to model deployment circuitry), operation pipeline analytics 426 (e.g., relating to operation pipeline analytics circuitry), and/or query service 427 (e.g., relating to query service circuitry). The control parameters 428 provide and specify configuration and operating options for the control instructions 422, operating system 421, and other functionality of the computer device 400.

The computer device 400 may further include various data storage 430. Each of the databases included in the data storage 430 may be accessed by the MR tool to obtain data for consideration during any one or more of the processes described herein.

In some implementations according to the description above, a system is disclosed. The system may include a knowledge graph generation circuitry configured to generate a knowledge graph including a plurality of entity nodes; a knowledge graph retraining circuitry configured to run a set of queries on the knowledge graph, the set of queries including at least one of a set of model analysis queries, a set of data analysis queries, or a set of model retraining queries; and determine one or more analytical models for retraining based on query results to the set of queries run on the knowledge graph.

In the implementations above, the entity nodes may include two or more of a user entity node, a step entity node, a resource entity node, a pipeline entity node, a run entity node, a model entity node, or a model code entity node.

In any one of the implementations above, the system may further include knowledge graph user interface circuitry configured to present the one or more analytical models for retraining on a knowledge graph user interface. The knowledge graph user interface circuitry may be further configured to present improvement results to the retraining.

In some implementations, a method is disclosed. The method may include generating a knowledge graph including a plurality of entity nodes; running a set of queries on the knowledge graph, the set of queries including at least one of a set of model analysis queries, a set of data analysis queries, or a set of model retraining queries; and determining one or more analytical models for retraining based on query results to the set of queries run on the knowledge graph.

The method implementations above may further include presenting the one or more analytical models for retraining on a knowledge graph user interface. The method may further include presenting improvement results to the retraining on the knowledge graph user interface.

In some implementations, non-transitory machine readable storage medium storing instructions is disclosed. The instructions, when executed, may cause processing circuitry to generate a knowledge graph including a plurality of entity nodes; run a set of queries on the knowledge graph, the set of queries including at least one of a set of model analysis queries, a set of data analysis queries, or a set of model retraining queries; and determine one or more analytical models for retraining based on query results to the set of queries run on the knowledge graph.

In the non-transitory machine readable storage medium implementations above, the instructions, when executed, may further cause processing circuitry to present the one or more analytical models for retraining on a knowledge graph user interface; and present improvement results to the retraining on the knowledge graph user interface.

In any one of the implementations above, the set of model analysis queries may include at least one of a query on which analytical models are underperforming, a query on which analytical models represented in the knowledge graph are similar, or a query on which analytical models represented in the knowledge graph are recommend for use.

In any one of the implementations above, the set of data analysis queries may include at least one of a query on which datasets represented in the knowledge graph are low quality, or a query on which datasets represented in the knowledge graph can be used for a specified analytical model.

In any one of the implementations above, the set of model retraining queries may include at least one of a query on which dataset represented in the knowledge graph should be referenced for retraining, a query on which model parameters should be updated for retraining, or a query on determining whether an analytical model observed performance improvement based on retraining.

Various implementations have been specifically described. However, other implementations that include a fewer, or greater, number of features and/or components for each of the apparatuses, methods, or other embodiments described herein are also possible.

What is claimed is:

1. A system comprising memory for storing computer instructions and a processor for executing the computer instructions to:
   generate a knowledge graph including a plurality of entity nodes configured to describe history and current status of training, usage, deployment, and management of a model library comprising a set of analytical models, the knowledge graph being generated on demand for analytical model retraining by:
   selecting one or more model retraining knowledge graph pipelines in response to a model retraining knowledge graph pipeline object request;
   retrieving the knowledge graph as an instance of model retraining knowledge graphs stored in a knowledge graph instance storage;
   retrieving a knowledge graph schema from a knowledge graph schema storage;
   retrieving one or more model management datasets associated with the one or more retraining knowledge graph pipelines from corresponding storage bins within a model management storage; and
   rewriting the knowledge graph based on the one or more model management datasets and the knowledge graph schema;
   run a set of queries on the knowledge graph, the set of queries including at least a model performance query of one or more of the set of analytical models, a data query for an assessment of training quality of training datasets of the one or more of the set of analytical models, and a model retraining query of the one or more of the set of analytical models;
   select a subset of training datasets based on the assessment of training quality of training datasets;
   determine that a portion of training dataset can be used to train and improve quality of another larger training dataset and train the another larger training dataset using the portion of training dataset;
   determine one or more target analytical models from the set of analytical models for retraining based on query results to the set of queries run on the knowledge graph;
   determine a set of model hyper-parameters to be updated in the one or more target analytical models;
   automatically update the set of model hyper-parameters;
   automatically retrain the one or more target analytical models under the set of model hyper-permeameters as updated and using the subset of training dataset;
   provide auto-generated reasons and insights with respect to updating the set of model hyper-parameters, what pipelines for the one or more target analytical models are impacted, why the one or more target analytical models are retrained, which data scientist produce the best results, and which of the one or more target analytical models lead to better results for a given type of dataset via a knowledge graph user interface; and
   update the knowledge graph with respect to the history and current status of training, usage, deployment, and management of the target analytical models according to the retraining.

2. The system of claim 1, wherein the entity nodes include two or more of a user entity node, a step entity node, a resource entity node, a pipeline entity node, a run entity node, a model entity node, or a model code entity node.

3. The system of claim 1, wherein the model performance query includes a query for which analytical models are underperforming.

4. The system of claim 1, wherein the data query includes a query for which datasets represented in the knowledge graph are low quality, or a query for which datasets represented in the knowledge graph can be used for a specified analytical model.

5. The system of claim 1, wherein the model retraining query includes a query for which dataset represented in the knowledge graph should be referenced for retraining, a query for which model parameters should be updated for retraining, or a query for determining whether an analytical model observed performance improvement based on retraining.

6. The system of claim 1, wherein the processor is further configured to execute the computer instructions to:
   present the one or more target analytical models for retraining on the knowledge graph user interface.

7. The system of claim 6, wherein the processor is further configured execute the computer instructions to:
   present improvement results of the retraining on the knowledge graph user interface.

8. A method comprising:
   generating a knowledge graph including a plurality of entity nodes each configured to describe history and current status of training, usage, deployment, and management of a model library comprising a set of analytical models, the knowledge graph being generated on demand for analytical model retraining by:
   selecting one or more model retraining knowledge graph pipelines in response to a model retraining knowledge graph pipeline object request;
   retrieving the knowledge graph as an instance of model retraining knowledge graphs stored in a knowledge graph instance storage;
   retrieving a knowledge graph schema from a knowledge graph schema storage;
   retrieving one or more model management datasets associated with the one or more retraining knowledge graph pipelines from corresponding storage bins within a model management storage; and
   rewriting the knowledge graph based on the one or more model management datasets and the knowledge graph schema;
   running a set of queries on the knowledge graph, the set of queries including at least a model performance query of one or more of the set of analytical models, a data query for an assessment of training quality of training datasets of the one or more of the set of analytical models, and a model retraining query of the one or more of the set of analytical models;

selecting a subset of training datasets based on the assessment of training quality of training datasets;

determining that a portion of training dataset can be used to train and improve quality of another larger training dataset and train the another larger training dataset using the portion of training dataset;

determining one or more target analytical models from the set of analytical models for retraining based on query results to the set of queries run on the knowledge graph;

determine a set of model hyper-parameters to be updated in the one or more target analytical models;

automatically update the set of model hyper-parameters;

automatically retrain the one or more target analytical models under the set of model hyper-permeameters as updated and using the subset of training dataset:

providing auto-generated reasons and insights with respect to updating the set of model hyper-parameters, what pipelines for the one or more target analytical models are impacted, why the one or more target analytical models are retrained, which data scientist produce the best results, and which of the one or more target analytical models lead to better results for a given type of dataset via a knowledge graph user interface; and updating the knowledge graph with respect to the history and current status of training, usage, deployment, and management of the target analytical models according to the retraining.

9. The method of claim 8, wherein the entity nodes include two or more of a user entity node, a step entity node, a resource entity node, a pipeline entity node, a run entity node, a model entity node, or a model code entity node.

10. The method of claim 8, wherein the model performance query includes a query for which analytical models are underperforming.

11. The method of claim 8, wherein the data query includes a query for which datasets represented in the knowledge graph are low quality, or a query for which datasets represented in the knowledge graph can be used for a specified analytical model.

12. The method of claim 8, wherein the model retraining query includes a query for which dataset represented in the knowledge graph should be referenced for retraining, a query for which model parameters should be updated for retraining, or a query for determining whether an analytical model observed performance improvement based on retraining.

13. The method of claim 8, further comprising:
presenting the one or more target analytical models for retraining on the knowledge graph user interface.

14. The method of claim 13, further comprising:
presenting improvement results of the retraining on the knowledge graph user interface.

15. A non-transitory machine readable storage medium for storing instructions that, when executed, cause processing circuitry to:

generate a knowledge graph including a plurality of entity nodes configured to describe history and current status of training, usage, deployment, and management of a model library comprising a set of analytical models, the knowledge graph being generated on demand for analytical model retraining by:

selecting one or more model retraining knowledge graph pipelines in response to a model retraining knowledge graph pipeline object request;

retrieving the knowledge graph as an instance of model retraining knowledge graphs stored in a knowledge graph instance storage;

retrieving a knowledge graph schema from a knowledge graph schema storage;

retrieving one or more model management datasets associated with the one or more retraining knowledge graph pipelines from corresponding storage bins within a model management storage; and rewriting the knowledge graph based on the one or more model management datasets and the knowledge graph schema;

run a set of queries on the knowledge graph, the set of queries including at least a model performance query of one or more of the set of analytical models, a data query for an assessment of training quality of training datasets of the one or more of the set of analytical models, and a model retraining query of the one or more of the set of analytical models;

select a subset of training datasets based on the assessment of training quality of training datasets;

determine that a portion of training dataset can be used to train and improve quality of another larger training dataset and train the another larger training dataset using the portion of training dataset;

determine one or more target analytical models from the set of analytical models for retraining based on query results to the set of queries run on the knowledge graph;

determine a set of model hyper-parameters to be updated in the one or more target analytical models;

automatically update the set of model hyper-parameters;

automatically retrain the one or more target analytical models under the set of model hyper-permeameters as updated and using the subset of training dataset:

provide auto-generated reasons and insights with respect to updating the set of model hyper-parameters, what pipelines for the one or more target analytical models are impacted, why the one or more target analytical models are retrained, which data scientist produce the best results, and which of the one or more target analytical models lead to better results for a given type of dataset via a knowledge graph user interface; and update the knowledge graph with respect to the history and current status of training, usage, deployment, and management of the target analytical models according to the retraining.

16. The non-transitory machine readable storage medium of claim 15, wherein the entity nodes include two or more of a user entity node, a step entity node, a resource entity node, a pipeline entity node, a run entity node, a model entity node, or a model code entity node.

17. The non-transitory machine readable storage medium of claim 15, wherein the model performance query includes a query for which analytical models are underperforming.

18. The non-transitory machine readable storage medium of claim 15, wherein the data query includes a query for which datasets represented in the knowledge graph are low quality, or a query for which datasets represented in the knowledge graph can be used for a specified analytical model.

19. The non-transitory machine readable storage medium of claim 15, wherein the model retraining query includes a query for which dataset represented in the knowledge graph should be referenced for retraining, a query for which model parameters should be updated for retraining, or a query for determining whether an analytical model observed performance improvement based on retraining.

20. The non-transitory machine readable storage medium of claim 15, further storing instructions that, when executed, cause processing circuitry to:
    present the one or more target analytical models for retraining on the knowledge graph user interface; and
    present improvement results of the retraining on the knowledge graph user interface.

\* \* \* \* \*